United States Patent
Pintos et al.

(10) Patent No.: US 7,581,190 B2
(45) Date of Patent: Aug. 25, 2009

(54) CONSTRUCTING USER INTERFACES ON TOP OF CMDLETS

(75) Inventors: Fabio Andre Pintos, Kirkland, WA (US); Vivek Sharma, Seattle, WA (US); Mihai R. Jalobeanu, Sammamish, WA (US); Vanessa Feliberti, Sammamish, WA (US); Brad Clark, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/488,978

(22) Filed: Jul. 19, 2006

(65) Prior Publication Data

US 2008/0021842 A1    Jan. 24, 2008

(51) Int. Cl.
*G06F 3/00* (2006.01)
*G06F 3/048* (2006.01)

(52) U.S. Cl. .................. 715/762; 715/763; 715/826
(58) Field of Classification Search ............... 715/230, 715/248, 249, 234, 762, 763, 826; 705/1, 705/80; 707/6, 10, 100; 709/223, 224
See application file for complete search history.

(56) References Cited

U.S. PATENT DOCUMENTS

| | | | | |
|---|---|---|---|---|
| 6,366,581 B1 * | 4/2002 | Jepsen | ........................ | 370/397 |
| 6,601,233 B1 | 7/2003 | Underwood | ................ | 717/102 |
| 6,639,687 B1 | 10/2003 | Neilsen | ...................... | 358/1.14 |
| 6,941,522 B2 | 9/2005 | Brown | ........................ | 715/772 |
| 6,944,644 B2 | 9/2005 | Gideon | ........................ | 709/203 |
| 6,971,001 B1 | 11/2005 | Rolfs | ............................. | 713/1 |
| 6,996,800 B2 | 2/2006 | Lucassen et al. | ............ | 717/106 |
| 2004/0226027 A1 | 11/2004 | Winter | ........................ | 719/328 |
| 2005/0027752 A1 | 2/2005 | Gelbard | ...................... | 707/200 |
| 2005/0091201 A1 * | 4/2005 | Snover et al. | ................... | 707/3 |
| 2005/0091258 A1 | 4/2005 | Snover et al. | ............... | 707/102 |
| 2005/0108272 A1 | 5/2005 | Behrens et al. | ............. | 707/102 |
| 2005/0114485 A1 * | 5/2005 | McCollum | ................... | 709/223 |
| 2005/0144226 A1 | 6/2005 | Purewal | ...................... | 709/203 |

OTHER PUBLICATIONS

Bendsen, P. "Model-Driven Business UI Based on Maps", *SIGMOD*, 2004, 5 pages, http://delivery.acm.org.
Goderis, S. et al., "A Declarative DSL Approach to UI Specification-Making UI's Programming Language Independent", 7 pages, http://prog.vub.ac.be/~dderidde/Downloads/Papers/ERLS2004.pdf.
Wampler, B.E. Ph.D., "V—A Free C++ GUI Framework for X", Feb. 28, 2006, http://delivery.acm.org, 4 pages.

* cited by examiner

*Primary Examiner*—Weilun Lo
*Assistant Examiner*—Truc T Chuong
(74) *Attorney, Agent, or Firm*—Woodcock Washburn LLP (57) ABSTRACT

A method using cmdlets in association with a graphical user interface for an application, a command line interface, and a web-based interface for the application includes generating a command which invokes at least one cmdlet. Each cmdlets containing the business logic for the application. The same cmdlets may be invoked from either the GUI, the command line, or the web-based interface. The result is that the task performed by the cmdlet is the same for each interface where each interface is absent business logic.

16 Claims, 4 Drawing Sheets

CONSTRUCTING USER INTERFACES ON TOP OF CMDLETS

BACKGROUND

The design of a graphical user interface (GUI) generally involves the use of application programming interfaces (APIs) which are written to satisfy business logic. The business logic is tied to the expected conduct of the application that the GUI will support. Alternately, a GUI is developed to directly contain business logic to make the GUI function specifically for the target application. There are several drawbacks to this common approach. One drawback is that there is no easy way to access the business logic outside of the GUI. The GUI must be accessed in order to use the business logic that the GUI contains. Another drawback is that there is no symmetry between GUI and APIs which are available outside of GUI. There is no guarantee that other, non-GUI portions of code have access to the same business logic rules and program solutions. For example, in current GUI programming environments, little or no attention paid to command line (cmdline) interface. Thus there is usually a difference in performance experience between the use of the GUI and the cmdline.

One consequence of placing business logic into a GUI is that the GUI code is hard to maintain as business logic. This is evident because internal product operations are intermixed with presentation logic such as the GUI visuals. Accordingly, GUI and APIs are hard to maintain and develop as they are hard coded to specific scenarios. When a "hotfix" or service pack is applied, the GUI has to be changed to accommodate fixes in the business logic.

Another consequence of placing business logic into a GUI is that the application product team is constrained in what can be added to GUI after release. Since the business logic is hard coded into the GUI, it is hard to add new features or adjust visuals over time. The application product development cycle is also restricted for management testing and development because the GUI has to be built before any testing of the management of a feature can be done. Since the GUI is traditionally completed towards the end of a product cycle, this can be risky because application testing does not usually occur for managing a feature until the GUI is available. When the GUI is scheduled late in the development process, critical test may be delayed. Also, if validation logic is embedded in the GUI, it may not be reusable if a GUI visual or business logic change is made.

Thus there may be an advantage to designing an GUI such that the visual features are abstracted away from all business logic. However, no methodology or infrastructure exists to do so in a generic manner that is applicable to any variety of operations. In the past, APIs have been designed to be generic, but quickly devolve into library functions for the GUI, which still poses the same problems noted previously.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect of the invention, an environment to execute a task under an application provides multiple types of interfaces for user input. One input may be a graphical user interface, another may be a command line interface, and a third may be a web-based application interface. In order to avoid replication of application business logic in each interface, a command is constructed outside of the user interface which may call lower tier cmdlets having the business logic for the application. The cmdlet is called via a task request sent via any of the user interfaces to a cmdlet execution engine. Thus the execution of the task is completed in the same manner even if a different form of user interface is used to request the task.

DETAILED DESCRIPTION

Exemplary Embodiments

Figure 1:
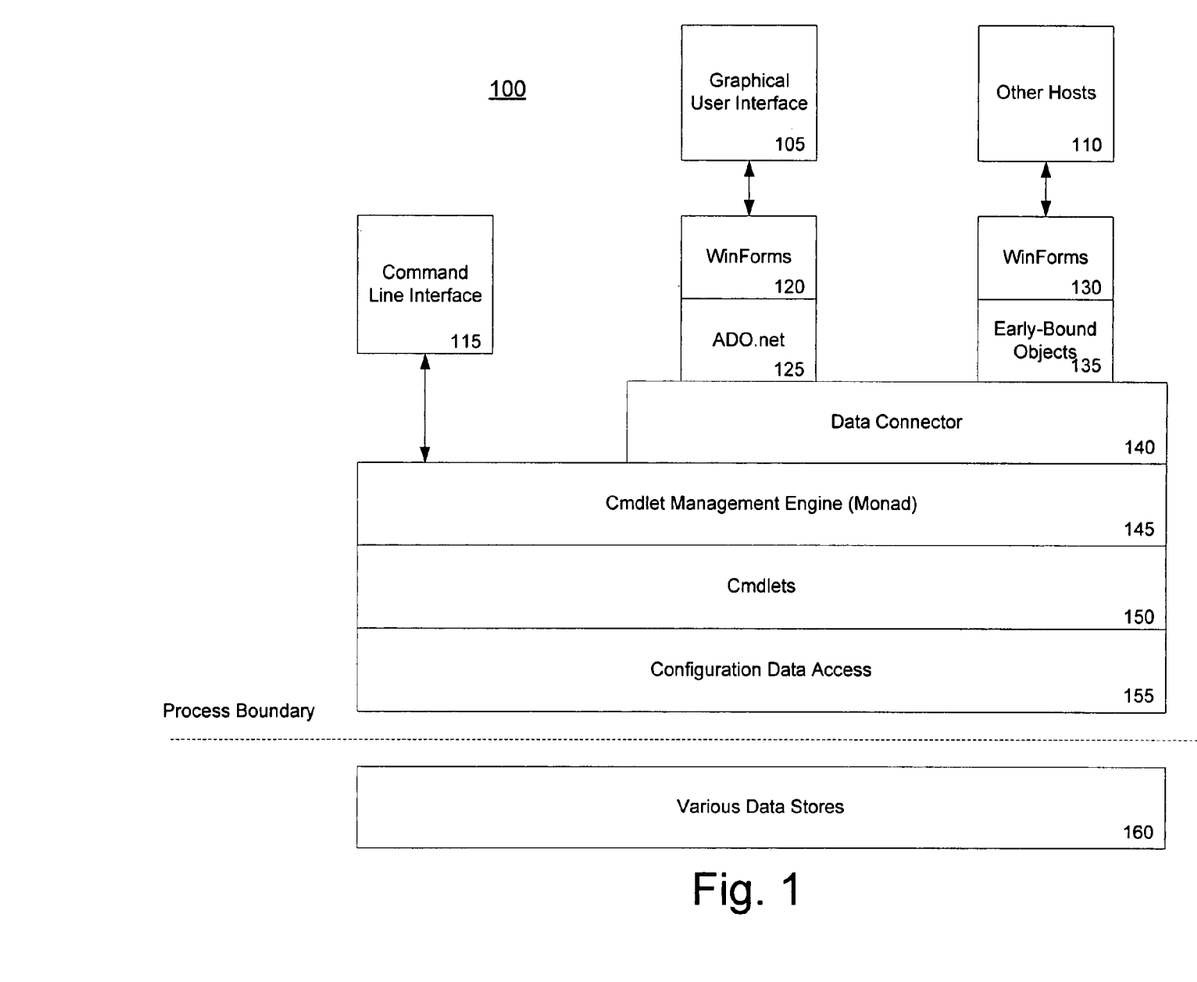
FIG. 1 is a block diagram showing a computer architecture having cmdlet aspects according to the invention.

FIG. 1 depicts an architecture 100 having aspects of the invention. The architecture allows the use of cmdlets to be used by a command line interface 115, a graphical user interface (GUI) 105 and or other hosts 110, such as an interactive web service. The same cmdlets may be used as a result of any interaction by the user via the command line 115, GUI 105 or another host. As a result, the user experience and performance using any of the interfaces is essentially the same because the same cmdlets are invoked for a given task requested from any of the user interfaces 115, 105, and 110.

Cmdlets are the basic units of execution of a management engine 145 such as the Microsoft Shell™ (MSH) available from Microsoft® Corporation of Redmond, Wash. A cmdlet is named by two parts: a verb and a noun. The cmdlet is written with the noun following the verb, with a dash in between. An example is "get-member", which is a cmdlet that prints out all public members of the object passed to it. Verb-noun is the naming convention used that specifies with clarity what cmdlets do. This naming convention is enforced programmatically in the construction of cmdlets. Cmdlets are .NET classes designed to use the features of the cmdlet management engine environment.

Cmdlets contain the business logic and are separate and independent from the GUI, command interface, or any other user interface. These user interfaces are absent business logic programming because such programming is located solely in the cmdlets. Cmdlets may be treated like objects in terms of maintaining them, but they exhibit special behavior and thus are quite different from standard objects such as application files, pictures, and the like. Unlike most objects, cmdlets can be executed to perform a task. Cmdlets are created using a specific set of rules. Those rules include, but are not limited to, how cmdlets receive input from the user, how parameters are declared as mandatory or optional and how progress, warnings, and errors are reported back to the user. Cmdlets are not equivalent to objects because cmdlets must follow strict rules and APIs that are defined by the management shell and the data provider. Objects have no requirements to be executable and to follow APIs defined by the management shell.

Cmdlets 150 are made available to a management engine 145 which performs tasks based on the execution of cmdlets. An example of the management engine is the Microsoft® Monad engine. The Monad engine can pass data between various cmdlets as objects which are structured data and it can be used by many different host applications, each host providing input and consuming output of cmdlets in whatever way necessary. In particular, a command line host can let the user type text and use that as input, then convert objects to their string representation and provide that as the output. GUI applications can use complex user interfaces to obtain input from the end user and can draw complex lists, property pages and other graphic elements with the results of cmdlets. Cmdlets are specially constructed .Net classes that encompass all the business logic for a particular operation. For example, moving a mailbox is represented by the cmdlet "move-mailbox". This code can be called directly from the command line interface 105 or a script using the commandline. The cmdlets may call into internal libraries that help them do some work, such as connecting to a data source 160, such as the Active Directory.

When using cmdlets, the management engine 145 may have access to configuration data access 155 so that the actions of executed cmdlets can access data from various data stores 160. This basic capability to use cmdlets 150 via the management engine 145 permits the construction of user interfaces which can operate in such a way as to render the same user experience while the user is using a command line interface 115, a graphical user interface, 105 or some other host 110, such as a web service interface.

When using a command line interface 115, the user would invoke a cmdlet via the management engine 145. A specific cmdlet may execute which has configuration data access 155 to various data stores 160 to assist in the execution of a user command from the command line interface 115. Similarly, the user at a graphical user interface 105 may request a function that essentially performs the same task using the same cmdlets as the command line interface 115.

The graphical user interface 105 communicates with a WinForms function 120 that provides the graphical user interface application programming interface (API) included as a part of Microsoft's .NET™ Framework, providing access to the native Microsoft Windows interface elements by wrapping the existing Win32 API in managed code. GUI framework 105 is designed to execute cmdlets rather than call business logic directly. This separates this GUI from others previously conceived because the business logic is removed from the GUI programming. As mentioned above, the business logic is contained in the cmdlets for uniformity of user experience and machine performance. In the GUI 105, a given cmdlet or sets of cmdlets are bound to a visual item, such as a "Refresh Button" or "Move this mailbox . . . " button. Then, a data connector 140 is bound to gather the results. The GUI can then be written to work abstractly from the business logic.

The GUI works through the WinForms 120 functional block which communicates with the .NET version of Active Data Objects (ADO) 125. ADO.NET 125 supports XML documents and data transfers and relies on .NET Data Providers, such as the data connector 140 as an interface layer between the GUI 105 and the lower level data sources 160. This scenario is used by GUI applications when the functionality found in ADO.Net DataTable, DataView and DataAdapter are appropriate, such as when providing rich list views.

The data connector 140 supports collecting and formatting data that can be returned by using cmdlets. The GUI interface 105 generally uses structured data that may be atomic in nature or be a series of collections. The challenge for a generic API is to provide the GUI with structured data that can be used to construct rich visuals. An example of a collection is a list of objects that represent currently logged-on users. The data connector enables the proper formatting of data by constructing collections that the GUI can use from data returned by cmdlets. In another aspect, the data connector 140 functions to allow correct input to flow from the cmdlets to the interfaces (GUI or cmdline) as well as allow correct input to flow to the cmdlets from a user. One aspect in particular of this invention is that the public interface of the data connector 140 exposed to the GUI applications follows the standards established by other data connectors found in the .Net Framework, such as the SQL connector. This allows developers to easily transition from a SQL-based environment to a Monad-based environment and allows the application to use existing functionality that was designed for SQL with Monad cmdlets, without requiring users to relearn everything from scratch.

WinForms 130 and early bound objects 135 also function to bridge between the other hosts, such as web-based services that are interactive with a user and the data connector 140 by preparing objects for viewing via the other hosts. This results in the user of a web-based interactive service being able to access data sources 160 in a manner that is identical in user experience and machine performance because the same cmdlets may be used for a given task via the command line interface 115, the graphical user interface 105, and the other hosts 110. This scenario is used to support property page scenarios in the GUI, where the rich validation provided by live objects is necessary to ensure the integrity of the data without invoking a cmdlet until all changes made by the user are ready to be persisted in the system.

Figure 2:
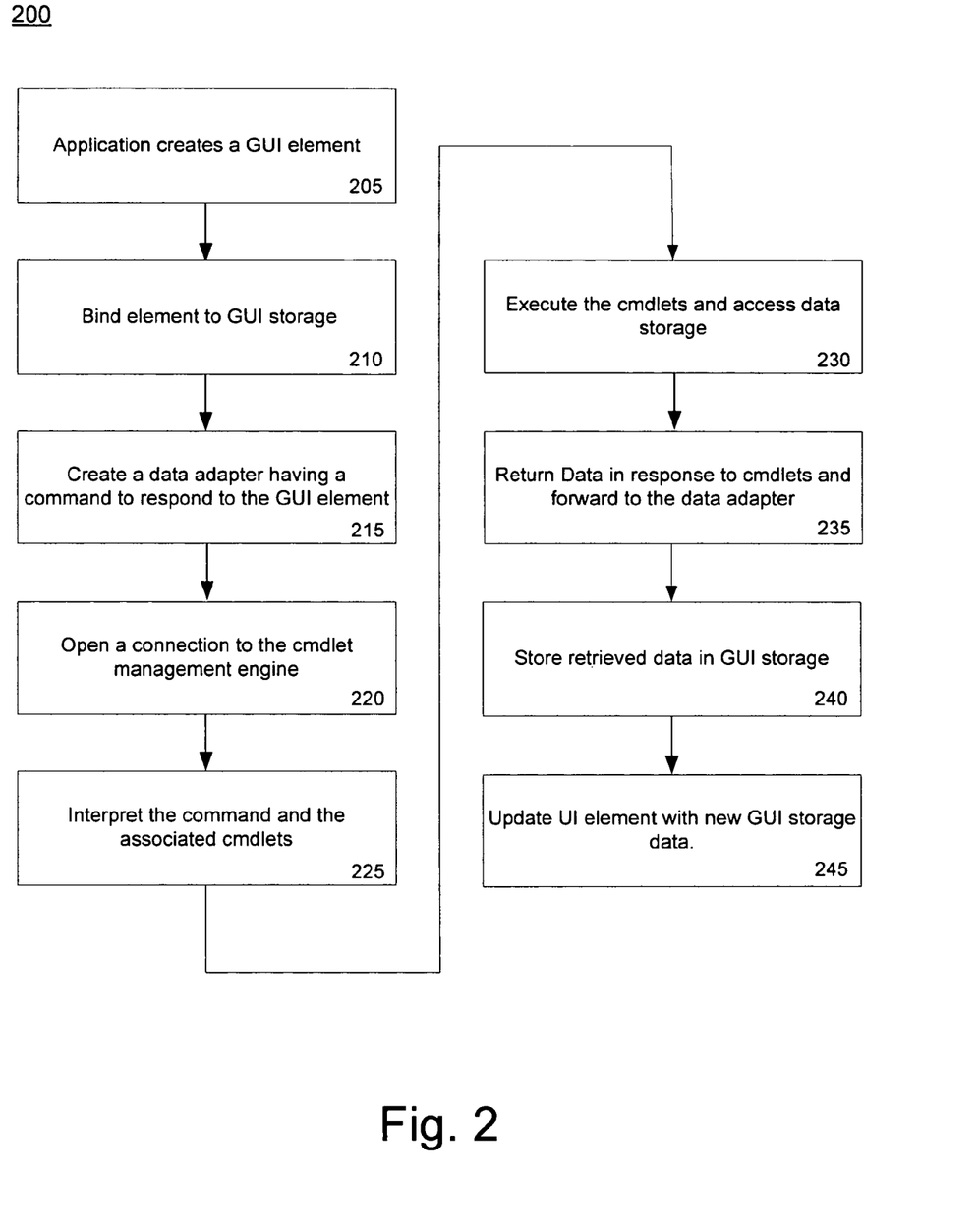
FIG. 2 is an example flow diagram demonstrating aspects of a graphical user interface and the cmdlets aspect of the invention.

FIG. 2 is an example flow diagram for a method 200 to use cmdlets via a graphical user interface. In one aspect of the invention, the use of cmdlets in conjunction with a command line interface and a graphical user interface allows the user experience and the computing performance to be very similar. The similarity is a performance result due to the commonality in the use of the same cmdlet or set of cmdlets to perform a requested task regardless of the user interface used. Thus, the same task requested via a graphical user interface, or a command line interface, or another host type interface, such as a web server, will result in the same computer function performance.

The example method 200 of FIG. 2 depicts how an application can populate a GUI element. The method 200 begins with the creation, by an application, of a GUI element (step 205). In one embodiment, the element can be a list view or a property page with multiple controls. In such an instance, a user may request, via the application GUI 105, to update data represented by the element and present it to the user. Here, the element is associated with at least one item or set of data in data storage. The application GUI 105 forwards that request for data and the new element becomes bound to local GUI storage (step 210). The process of data-binding ensures that when the data in the GUI storage changes by any means, the GUI elements display the updated data. When the GUI element is changed by the end user, the updated values are stored back in the GUI storage.

The application creates a data connector or adapter 140 to address the new data element (step 215). The data adapter 140 configures an appropriate command to execute. The command contains instructions as to how data is to be retrieved. The command is written with the syntax supported by the management engine 145, such as Monad. One example command is a cmdlet which is expressed in its standard verb-noun syntax. Another example of a command is a command having a syntax that allows the invocation of one or more cmdlets. An example cmdlet name is "get-mailbox". Note that the command may contain a single instruction or cmdlet or it can be composed of multiple instructions or cmdlets combined to return something meaningful for the application.

A connection is opened (step 220) which causes the management engine 145 (i.e. the Monad engine) to be loaded into the process generated by the creation of the element. The management engine interprets the command (step 225) and runs the cmdlets 150 associated with it. The cmdlets 150 in turn access the data storage 155, 160 (step 230) that contains the information related to the new element and to retrieve and return the data using the interfaces defined by the management engine 145.

The retrieved data concerning the new element is then returned (step 235) by the engine 145 and forwarded to the command generated by the data adapter 140. The retrieved data flows up to the data adapter 140 until it is finally stored in the GUI local storage (step 240). Data-binding picks up the change in the GUI local storage and pushes this retrieved data into the GUI element (step 245) and the end result is that relevant element data for the element shows up in the screen allowing the end user to view and interact with the element and data.

It is noted that steps 205 through 245 may also occur similarly if the command line interface 115 is used in place of the graphical user interface. The similarity is seen via the use of the same cmdlet used to activate the management engine 140. The result is therefore predictable and guaranteed to be the same in terms of returned data, although the viewer may see a different depiction of the results in the GUI 105 versus the command line interface 115. The same can be said of the predictability of the performance of the host interface 110 in that the same effect is achieved because the same cmdlet is used in all instances for a particular task.

Figure 3:
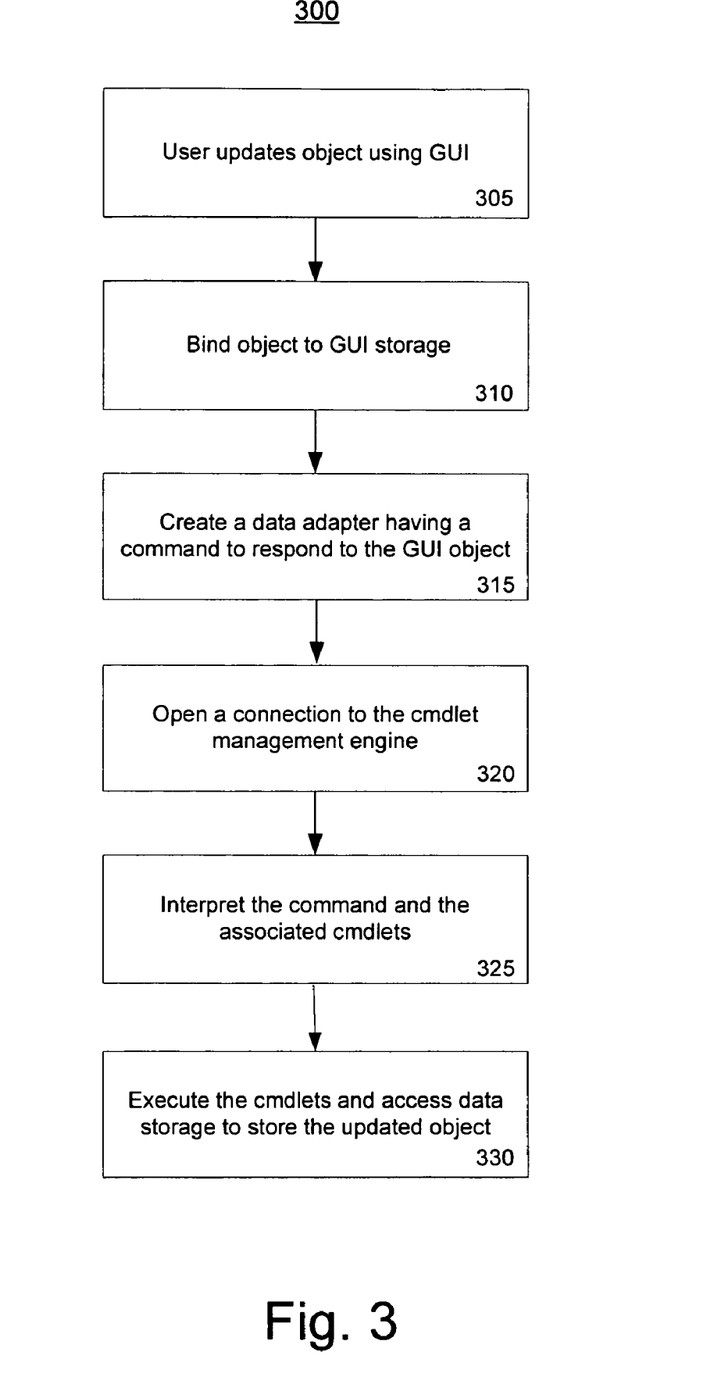
FIG. 3 is another example flow diagram demonstrating the cmdlet aspect of the invention.

In one aspect of the invention, the method 300 of FIG. 3 may be used if the task to be performed is an update of data via a GUI. Initially, a user completes editing an object in a GUI and clicks an Apply or Ok button associated with the GUI (step 305). The updated object is bound to the GUI storage (step 310). The user interface creates a data adapter (step 315) or connector 140 configured with a command to save the changes to the object, including the parameters with updated values. Here, the command is likely to be a "set" task instead of a "get" task. For example, the user may be changing the size of a mailbox and the command selected may be "set-mailbox-Size 1 Gb". More complex applications may use the ability to pass data objects as parameters instead of trying to create a text version of the changes. Once the command if fully configured, a connection is opened (step 320) and the management engine (145) will interpret (step 225) the command and invoke the respective cmdlets (150). The cmdlets are executed to store (step 230) the updated object or element in the data store 160.

As before, the effect of using a GUI 105 or a command line interface 115 or another host interface 110 is essentially the same because each interface will use the same cmdlets to perform the task. The cmdlets being generated having the business logic separate from any of the GUI 105 or command line interface 115 or other host interface 110. Thus, generation or update of the business logic is separate from the stated user interfaces.

In one non-limiting example, cmdlets to get-mailbox, set-mailbox, and remove-mailbox are shown in use:

Consider there are the following objects and cmdlets available in the system:

```
Data object:
class Mailbox
{
    public Guid    Identity;
    public string  Name;
    public int     Size;
    ...            // and possibly many more properties
    the UI is not interested in.
}
Cmdlets:
get-mailbox
set-mailbox
remove-mailbox
```

Creating a connection to the Monad engine for use by the process:

```
MonadConnection connection = new MonadConnection( );
connection.Open( );
```

Showing a list of objects in the UI:

```
// Get the list of objects by executing a monad command:
MonadCommand command = new MonadCommand("get-mailbox");
object[ ] mailboxes = command.Execute( );
// Show the list in the UI using data-binding. DataListView is
a specialization of the standard
// WinForms ListView; other standard list controls
could be used according to their capabilities (like
WinForms DataGridView, for example).
DataListView listView = new DataListView( );
listView.IdentityProperty = "Identity";      // allows the list to
identity objects by their
identity property
listView.Columns.Add("Mailbox            // column
Name", "Name");                          with header
"Mailbox Name" shows the "Name" property
listView.Columns.Add("Mailbox Size", "Size");
listView.DataSource = mailboxes;         // setting the list as the
data source causes the list view to show an item for each item in the list
```

Showing a list of objects using Monad, a DataTable and a list view:

```
// Instead of keeping a list of objects, we can fill a data table with their data.
// Data tables allow us to support scenarios that are not possible (or that are hard to
implement) using the strongly typed list.
// Create a data table with the properties we want to keep track. This is standard ADO.Net
code to create a data table.
```

-continued

```
DataTable dataTable = new DataTable( );
dataTable.Columns.Add("Identity", typeof(Guid));
dataTable.Columns.Add("Name", typeof(string));
dataTable.Columns.Add("Size", typeof(int));
// The data table can be set as the data source of the list view even while it is empty.
listView.DataSource = dataTable;
// Fill the data table using a data adapter by running the monad command.
MonadDataAdapter adapter = new MonadDataAdapter("get-mailbox", connection);
adapter.Fill(dataTable);
// Properly configured, this combination of data table, adapter and list view better supports
// scenarios such as asynchronous loading of the data and batch fill of the list view.
```

Performing actions in objects selected in a list:

```
// Get the identity of the object selected in the list.
Guid identity = (Guid) listView.GetSelectedObjectIdentity( );
// Perform an action in the selected object
MonadCommand command = new
MonadCommand("remove-mailbox", connection);
command.Parameters.AddWithValue("Identity", identity);
command.Execute( );
```

Showing the object in a property page using data-binding:

```
// Get a full instance of an object
MonadCommand command = new
MonadCommand("get-mailbox", connection);
command.Parameters.AddWithValue("Identity", identity);
Mailbox mailbox = (Mailbox) command.Execute( );           // get
an instance of the mailbox with the selected identity
// Use the object as data source of WinForms controls, ex:
TextBox nameTextBox = new TextBox( );
nameTextBox.DataBindings.Add("Text", dataSource, "Name");    //
data-bind the textbox to a property in the mailbox
// eventually, the UI would show the
control allowing the user to edit it.
```

Saving changes from property pages:

```
// This would get called when the user requests a property
page to save changes.
// Run the command passing the object as input value
MonadCommand command = new MonadCommand("set-mailbox",
connection); command.Execute(mailbox);
```

Exemplary Computing Device

Figure 4:
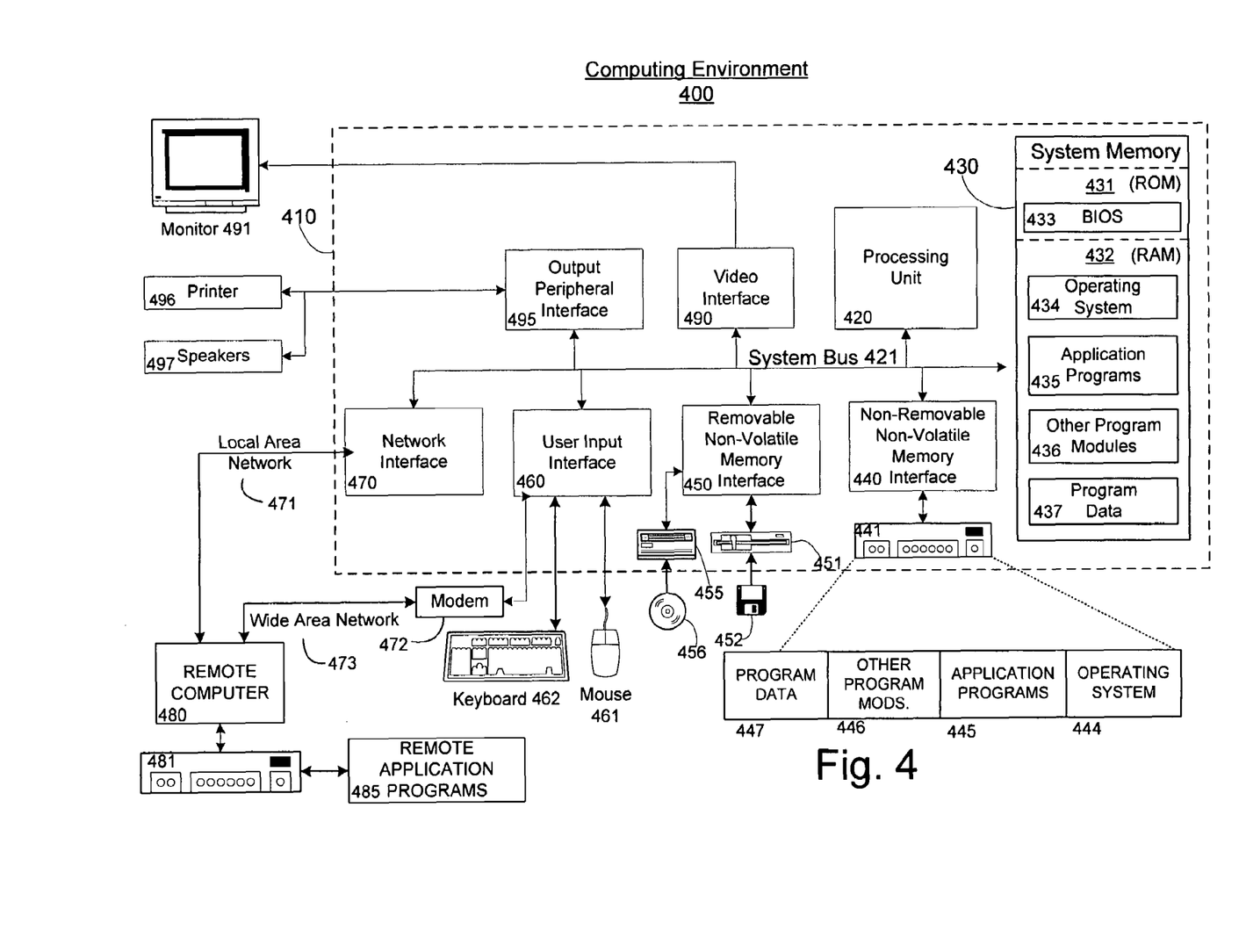
FIG. 4 is a block diagram showing an example host computing environment.

FIG. 4 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for using a GUI or a command line interface implemented with cmdlets. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to generate and operate a graphical user interface (GUI) element for an application using cmdlets, the method comprising:

creating a GUI element utilizing an application programming interface (API) for a GUI (graphical user interface) for an application, the GUI absent business logic for the application, the GUI element corresponding to at least one set of data in data storage, wherein XML data format transfers are supported;

binding the GUI element to local GUI storage;

creating a data adapter having a command corresponding to the creation of the GUI element, the data adapter interfacing between the GUI and a Monad-like cmdlet management engine that executes cmdlets of the application, wherein each cmdlet is a user interface-independent execution unit which contains business logic of the application for performing a particular task and which has a verb-noun naming convention that specifies the particular task;

opening a connection to the cmdlet management engine;

interpreting the command and invoking a cmdlet associated with the command; and executing the invoked cmdlet to place the GUI element in data storage.

2. The method of claim 1, further comprising:

accessing data corresponding to the GUI element;

storing the data corresponding to the GUI element in the local GUI storage; and updating the GUI element presented to a user with the data corresponding to the GUI element.

3. The method of claim 1, wherein creating a GUI element comprises creation of a new view of data at the request of a user.

4. The method of claim 1, wherein binding the element to local GUI storage comprises data-binding the element in GUI local storage such that a change to element data by a user or a change in the data corresponding to the element is stored in GUI local storage.

5. The method of claim 1, wherein creating a data adapter having a command comprises creating a data adapter which invokes a command that is a cmdlet.

6. The method of claim 1, wherein interpreting the command and invoking a cmdlet comprises interpreting the cmdlet using a cmdlet management engine.

7. A computer system to implement a graphical user interface (GUI) using cmdlets, the system comprising:

a graphical user interface (GUI) for a software application, the GUI having no business logic programming for the software application;

a command line interface having no business logic programming for the software application;

a Monad-like management engine that executes cmdlets of the application, wherein each cmdlet is a user interface-independent execution unit which contains business logic of the application for performing a particular task and which has a verb-noun naming convention that specifies the particular task;

a storage area for cmdlets;

a data connector which couples requests for information from the GUI to the management engine, the data connector generating a command for the management engine;

a data store for storing information to be accessed by one of the GUI and the command line interface;

wherein a user-initiated task request generated from the GUI flows to the data connector which generates a task-related command invoking a cmdlet for execution by the management engine, wherein the user-initiated task request generated from the command line interface invokes the cmdlet for execution by the management engine; and an application programming interface (API) and support for XML data format transfers.

8. The system of claim 7, wherein the API is acquired using a WinForms software package and support for the XML data format transfer is provided using an ADO.Net software package.

9. The system of claim 7, further comprising:

a user-interactive web-host interface which connects to the management engine via the data connector, wherein the web-host interface comprises no business logic for the application.

10. The system of claim 9, wherein a user-interaction with the web-host interface produces a communication to the management engine for the user-initiated task request which invokes the cmdlet for execution by the management engine.

11. A computer readable storage medium having instructions that are executable by a computer to perform a method for generating and operating a graphical user interface, the method comprising:

creating a GUI element utilizing an application programming interface (API) for an application GUI (graphical user interface), the application GUI absent business logic for the application, the GUI element corresponding to at least one set of data in data storage wherein XML data format transfers are supported;

binding the GUI element to local GUI storage;

creating a data adapter having a command corresponding to the creation of the GUI element, the data adapter interfacing between the application GUI and a Monad-like cmdlet management engine that executes cmdlets of the application, wherein each cmdlet is a user interface-independent execution unit which contains business logic of the application for performing a particular task and which has a verb-noun naming convention that specifies the particular task;

opening a connection to the cmdlet management engine;

interpreting the command and invoking a cmdlet associated with the command; and executing the invoked cmdlet to place the GUI element in data storage.

12. The computer readable storage medium of claim 11, further comprising instructions that are executable by a computer for:
- accessing data corresponding to the GUI element;
- storing the data corresponding to the GUI element in the local GUI storage; and
- updating the GUI element presented to a user with the data corresponding to the GUI element.

13. The computer readable storage medium of claim 11, wherein the instructions for creating a GUI element comprise instructions for creating a new view of data at the request of a user.

14. The computer readable storage medium of claim 11, wherein the instructions for binding the element to local GUI storage comprise instructions for data-binding the element in GUI local storage such that a change to element data by a user or a change in the data corresponding to the element is stored in GUI local storage.

15. The computer readable storage medium of claim 11, wherein the instructions for creating a data adapter having a command comprise instructions for creating a data adapter which invokes a command that is a cmdlet.

16. The computer readable storage medium of claim 11, wherein the instructions for interpreting the command and invoking a cmdlet comprise instructions for interpreting the cmdlet using a cmdlet management engine.

\* \* \* \* \*